US011146759B1

(12) United States Patent
Brune (10) Patent No.: US 11,146,759 B1
(45) Date of Patent: Oct. 12, 2021

(54) VEHICLE CAMERA SYSTEM (71) Applicant: JMJ Designs, LLC, Naples, FL (US)

(72) Inventor: Janet Brune, Naples, FL (US)

(*) Notice: Subject to any disclaimer, the term of this patent is extended or adjusted under 35 U.S.C. 154(b) by 0 days.

(21) Appl. No.: 16/682,861

(22) Filed: Nov. 13, 2019

Related U.S. Application Data (60) Provisional application No. 62/760,387, filed on Nov. 13, 2018.

(51) Int. Cl.
| | |
|---|---|
| *H04N 7/18* | (2006.01) |
| *G08B 13/196* | (2006.01) |
| *B60R 25/104* | (2013.01) |
| *B60R 25/30* | (2013.01) |
| *H04N 5/247* | (2006.01) |
| *H04N 5/232* | (2006.01) |
| *H04W 4/40* | (2018.01) |
| *G08B 7/00* | (2006.01) |
| *G10L 25/51* | (2013.01) |
| *H04R 1/08* | (2006.01) |
| *H04B 1/3822* | (2015.01) |

(52) U.S. Cl.
CPC .......... *H04N 7/188* (2013.01); *B60R 25/104* (2013.01); *B60R 25/305* (2013.01); *G08B 7/00* (2013.01); *G08B 13/196* (2013.01); *G10L 25/51* (2013.01); *H04B 1/3822* (2013.01); *H04N 5/23203* (2013.01); *H04N 5/247* (2013.01); *H04N 7/181* (2013.01); *H04R 1/08* (2013.01); *H04W 4/40* (2018.02); *H04R 2499/13* (2013.01)

(58) Field of Classification Search
CPC .... H04N 7/188; H04N 7/181; H04N 5/23203; H04N 5/247; G08B 13/19647; G08B 13/19697; G08B 13/19695; B60R 25/016; B60R 25/102; B60R 25/104; B60R 25/305; H04R 1/08; H04R 2499/13; H04W 4/40; G10L 25/51; H04B 1/3822
See application file for complete search history.

(56) References Cited

U.S. PATENT DOCUMENTS

| | | | |
|---|---|---|---|
| 6,940,397 B1* | 9/2005 | Le Mire | B60R 25/1004 180/287 |
| 7,319,378 B1* | 1/2008 | Thompson | B60R 25/102 340/426.1 |
| 7,847,709 B2* | 12/2010 | McCall | G01C 21/3632 340/988 |
| 8,284,041 B2* | 10/2012 | Cuddihy | B60N 2/002 340/457 |
| 8,493,177 B2* | 7/2013 | Flaherty | G08B 6/00 340/5.72 |
| 9,194,955 B1* | 11/2015 | Fahrner | G01S 19/16 |
| 9,536,197 B1* | 1/2017 | Penilla | G06F 3/147 |

(Continued)

*Primary Examiner* — Brian P Yenke
(74) *Attorney, Agent, or Firm* — John Rizvi; John Rizvi, P.A.—The Patent Professor®

(57) ABSTRACT

A vehicle camera system for integration into a vehicle may include a PCB or other controller. At least one camera may interface with the controller. The at least one camera may be integrated into the vehicle in at least one selected location or position on the vehicle. A motion sensor may interface with the controller. The motion sensor may be configured to detect motion of an object and/or a person approaching the vehicle and responsively activate the at least one camera to capture at least one image of an offending person and/or vehicle in the case of a collision or damage to the vehicle.

15 Claims, 6 Drawing Sheets

(56) References Cited

U.S. PATENT DOCUMENTS

| | | | | |
|---|---|---|---|---|
| 9,809,196 B1* | 11/2017 | Penilla | | G06Q 20/18 |
| 9,870,697 B2* | 1/2018 | Frew | | B60R 25/305 |
| 10,029,648 B2* | 7/2018 | Hwang | | G08B 13/19647 |
| 10,059,342 B2* | 8/2018 | Ricci | | G01C 21/3691 |
| 10,095,229 B2* | 10/2018 | Myers | | H04W 4/40 |
| 10,286,842 B2* | 5/2019 | Penilla | | B60L 53/665 |
| 10,387,966 B1* | 8/2019 | Shah | | G06Q 40/08 |
| 10,391,977 B1* | 8/2019 | Chhorn | | B60R 25/102 |
| 10,556,568 B2* | 2/2020 | Boehm | | G06K 9/00832 |
| 10,848,670 B2* | 11/2020 | Gatti | | H04N 5/23241 |
| 10,908,603 B2* | 2/2021 | Golgiri | | A63H 17/42 |
| 2003/0154009 A1* | 8/2003 | Basir | | G07C 5/085 |
| | | | | 701/32.2 |
| 2004/0188164 A1* | 9/2004 | Maeno | | B60R 25/305 |
| | | | | 180/287 |
| 2004/0233284 A1* | 11/2004 | Lesesky | | G08B 13/19619 |
| | | | | 348/148 |
| 2005/0156758 A1* | 7/2005 | Gilliss | | G08G 1/164 |
| | | | | 340/932.2 |
| 2005/0162260 A1* | 7/2005 | Gupte | | B60R 25/1004 |
| | | | | 340/426.18 |
| 2006/0250501 A1* | 11/2006 | Widmann | | G08B 13/19647 |
| | | | | 348/148 |
| 2008/0225120 A1* | 9/2008 | Stuecker | | G08B 13/19658 |
| | | | | 348/155 |
| 2009/0058685 A1* | 3/2009 | McCall | | G08G 1/0969 |
| | | | | 340/995.24 |
| 2009/0091477 A1* | 4/2009 | McCall | | G01S 19/42 |
| | | | | 340/990 |
| 2011/0279270 A1* | 11/2011 | Marckwald | | G08B 15/00 |
| | | | | 340/545.1 |
| 2012/0105635 A1* | 5/2012 | Erhardt | | G08B 13/19647 |
| | | | | 348/148 |
| 2012/0274776 A1* | 11/2012 | Gupta | | H04N 7/181 |
| | | | | 348/159 |
| 2014/0019913 A1* | 1/2014 | Newman | | G06F 3/04886 |
| | | | | 715/810 |
| 2014/0139331 A1* | 5/2014 | Oliver | | B60R 25/04 |
| | | | | 340/426.19 |
| 2014/0218529 A1* | 8/2014 | Mahmoud | | H04N 5/23241 |
| | | | | 348/148 |
| 2014/0375476 A1* | 12/2014 | Johnson | | G01C 21/36 |
| | | | | 340/932.2 |
| 2015/0009010 A1* | 1/2015 | Biemer | | G01G 19/44 |
| | | | | 340/5.83 |
| 2015/0161451 A1* | 6/2015 | Nye | | G06K 9/00771 |
| | | | | 382/103 |
| 2015/0172520 A1* | 6/2015 | Lindman | | G03B 11/043 |
| | | | | 382/190 |
| 2016/0105644 A1* | 4/2016 | Smith | | H04N 7/188 |
| | | | | 348/159 |
| 2016/0189513 A1* | 6/2016 | Sloo | | G08B 25/005 |
| | | | | 340/522 |
| 2016/0322078 A1* | 11/2016 | Bose | | A63F 13/217 |
| 2017/0080898 A1* | 3/2017 | Cogill | | B60R 25/102 |
| 2017/0193306 A1* | 7/2017 | Robil | | G06K 9/00295 |
| 2018/0072269 A1* | 3/2018 | Tong | | B60R 25/305 |
| 2018/0072270 A1* | 3/2018 | Renaud | | B60R 25/305 |
| 2018/0075565 A1* | 3/2018 | Myers | | G05D 1/0088 |
| 2018/0188027 A1* | 7/2018 | Zhang | | G06K 9/6212 |
| 2018/0367731 A1* | 12/2018 | Gatti | | G06K 9/00832 |
| 2019/0039546 A1* | 2/2019 | Elangovan | | G07C 9/0069 |
| 2019/0256045 A1* | 8/2019 | Siaka | | G08B 13/19647 |
| 2019/0265868 A1* | 8/2019 | Penilla | | G07C 5/008 |
| 2019/0294894 A1* | 9/2019 | Fox | | G08B 21/18 |
| 2020/0001827 A1* | 1/2020 | Shirazi | | B60R 25/102 |
| 2020/0011336 A1* | 1/2020 | Mitsuhashi | | F04D 19/048 |
| 2020/0104326 A1* | 4/2020 | Ricci | | H04L 63/0428 |
| 2020/0134760 A1* | 4/2020 | Messerges | | G06F 16/27 |
| 2020/0193005 A1* | 6/2020 | Babala | | G07C 9/00309 |
| 2020/0238952 A1* | 7/2020 | Lindsay | | B60R 25/25 |
| 2020/0329348 A1* | 10/2020 | Halun | | H04W 4/90 |
| 2021/0001810 A1* | 1/2021 | Rivard | | G06K 9/6272 |

* cited by examiner

VEHICLE CAMERA SYSTEM

CROSS-REFERENCE TO RELATED APPLICATIONS

This application claims the benefit of U.S. Provisional Patent Application Ser. No. 62/760,387, filed on Nov. 13, 2018, which is incorporated by reference herein in its entirety.

FIELD OF THE INVENTION

The present invention relates generally to vehicle cameras, and more particularly, to a vehicle camera system which can be integrated into a vehicle at one or more positions or locations to detect and reveal the identity of an offending person and/or vehicle in the case of a collision or damage to the vehicle.

BACKGROUND OF THE INVENTION

Vehicle collisions are an unfortunate reality on streets, highways and other roadways as well as in parking lots. Various factors including vehicle design, speed, driver skill or impairment and traffic may contribute to the likelihood of vehicle collisions. Under circumstances in which excessive speed is a factor, traffic collisions may lead to death and disability as well as financial costs to both society and the individuals involved.

In parking lots, vehicles are typically parked adjacent to each other such as in rectangular spaces or rows which may be marked with elongated strips of paint on the parking lot pavement. Parked vehicles are particularly vulnerable to vehicular hit-and-run incidents. A vehicular hit-and-run incident occurs when an offending vehicle strikes another vehicle and the driver of the offending vehicle then flees the scene of the accident without stopping to identify himself or herself. Often, the incident results in damage to the struck vehicle. When a hit and-run incident occurs, it is desirable to locate the driver of the offending vehicle for the recovery of damages. Locating the offending vehicle, however, may be difficult Many establishments such as office buildings and shopping centers are equipped with cameras to capture video surveillance of the premises. The function of these surveillance cameras is typically to capture video of criminal offenders who may vandalize property or steal items from stores in the establishment. The captured video may be recorded on recording media for identification and prosecution purposes.

Video surveillance systems which are used to monitor the premises of retail or other establishments are designed to identify and track the movements of persons inside and immediately outside the establishments. Therefore, the cameras of such a system are typically not focused or directed on the vehicles in the parking lot of the establishment. While the cameras may capture photos or video of an offending vehicle in a hit-and-run incident, it is unlikely that such cameras will capture images of the vehicle with sufficient clarity to identify the vehicle or the driver of the vehicle.

Accordingly, there remains a need for a solution to at least one of the aforementioned problems. For example, there is an established need for a vehicle camera system which can help detect and reveal the identity of an offending person and/or vehicle in the case of a collision or damage to a parked vehicle.

SUMMARY OF THE INVENTION

The present invention is directed to a vehicle camera system which can be integrated into a vehicle at one or more positions or locations to detect and reveal the identity of an offending person and/or vehicle in the case of a collision or damage to the vehicle. An illustrative embodiment of the vehicle camera system may include a PCB (Printed Circuit Board) or other controller. At least one camera may functionally interface with the controller. The at least one camera may be integrated into the vehicle in at least one selected position or location on the vehicle to capture video and/or photographic images of the offending vehicle and/or the driver of the offending vehicle in the event of a hit-and-run incident. In some embodiments, a motion sensor may interface with the controller. The motion sensor may detect the presence of a vehicle and/or person who approaches the vehicle. Responsive to input from the motion sensor, the controller may operate the at least one camera to begin recording the video and/or photographic images. The owner or driver of the struck vehicle may thus obtain video and/or photographic evidence concerning the identity of the offending vehicle and/or the driver of the offending vehicle. In some embodiments, in the event that the vehicle is struck by the offending vehicle, the controller may transmit a notification signal to a smartphone which is possessed by the owner of the struck vehicle. The smartphone may include a smartphone app which notifies the owner of the struck vehicle of the incident. In some embodiments, the controller may be configured to transmit the captured video and/or photographic images to the smartphone. The smartphone app may present the captured video and/or photographic images on the screen of the smartphone.

In a first implementation of the invention, a vehicle camera system for integration into a vehicle comprises a controller carried by the vehicle and one or more cameras interfacing with the controller. The one or more cameras are integrated into the vehicle in respective one or more selected positions in the vehicle, and are configured to capture images of the vicinity of the vehicle. The system further includes a motion sensor and a transceiver which are carried by the vehicle and interface with the controller. The motion sensor is configured to detect motion of an object and/or a person in the vicinity of the vehicle. The controller is configured to initiate image capturing by the one or more cameras and to cause the transceiver to emit a wireless positive detection signal, responsively to the motion sensor detecting the motion of an object and/or a person in the vicinity of the vehicle.

In a second aspect, the images may include a photographic image.

In another aspect, the images may include a video image.

In another aspect, the one or more cameras may include a camera located in a side view mirror of the vehicle.

In another aspect, the one or more cameras may include two cameras located in a left side view mirror and a right side view mirror, respectively, of the vehicle.

In yet another aspect, the two cameras may be configured to capture images of a side and front of the vehicle.

In another aspect, the one or more cameras can include a camera located at a rear of the vehicle and configured to capture images of an area behind the vehicle.

In another aspect, the vehicle camera system can further include a non-transitory computer-readable medium storing software instructions configured to cause an electronic processor to carry out the operations of:

enabling wireless communication between an electronic device and the controller, via the transceiver, wherein the electronic device comprises the electronic processor;

receiving the positive detection signal by the electronic processor; and responsively generating a sensory alarm notification perceivable by a user of the electronic device.

In another aspect, the sensory alarm notification may include at least one of a visual notification, an audible notification and a vibratory notification.

In yet another aspect, the electronic device may be a key fob.

In another aspect, the electronic device may be a phone.

In another aspect, the non-transitory computer-readable medium may stores software instructions configured to cause an electronic processor to further carry out the operations of:

providing a user interface accessible by the user of the electronic device;

receiving a user command entered via the user interface; and responsively transmitting a wireless deactivation signal receivable by the controller via the transceiver;

wherein the controller is configured to deactivate at least one of the motion sensor and the one or more cameras responsively to receiving the wireless deactivation signal.

In another aspect, the controller may be further configured to transmit images captured by the one or more cameras responsively to the motion sensor detecting the motion of an object and/or a person in the vicinity of the vehicle.

In yet another aspect, the vehicle camera system can further include a non-transitory computer-readable medium storing software instructions configured to cause an electronic processor to carry out the operations of:

enabling wireless communication between an electronic device and the controller, via the transceiver, wherein the electronic device comprises the electronic processor and a screen;

receiving, by the electronic processor, the positive detection signal and the images captured by the one or more cameras; and responsively generating a sensory alarm notification perceivable by a user of the electronic device and displaying the received images on the screen.

In another aspect, the one or more cameras may include a microphone configured to capture audio from the vicinity of the vehicle. The controller may be configured to transmit audio captured by the microphone responsively to the motion sensor detecting the motion of an object and/or a person in the vicinity of the vehicle.

In another aspect, the vehicle camera system can further include a non-transitory computer-readable medium storing software instructions configured to cause an electronic processor to carry out the operations of:

enabling wireless communication between an electronic device and the controller, via the transceiver, wherein the electronic device comprises the electronic processor, a screen and a speaker;

receiving, by the electronic processor, the positive detection signal and the images and audio captured by the one or more cameras; and responsively generating a sensory alarm notification perceivable by a user of the electronic device, displaying the received images on the screen and emitting the audio by the speaker.

In another implementation of the invention, a vehicle camera system for integration into a vehicle comprises a controller carried by the vehicle, and one or more cameras interfacing with the controller. The one or more cameras are integrated into the vehicle in respective one or more selected positions in the vehicle, and are configured to capture images of the vicinity of the vehicle. The vehicle camera system further includes a motion sensor and a transceiver carried by the vehicle and interfacing with the controller. The motion sensor is configured to detect motion of an object and/or a person in the vicinity of the vehicle. The controller is configured to initiate image capturing by the one or more cameras and to cause the transceiver to emit a wireless positive detection signal, responsively to the motion sensor detecting the motion of an object and/or a person in the vicinity of the vehicle. The vehicle camera system further includes a phone in wireless communication with the transceiver. The phone is configured to receive the positive detection signal by the electronic processor and responsively generate a sensory alarm notification perceivable by a user of the phone.

In yet another implementation of the invention, a vehicle camera system for integration into a vehicle comprises a controller carried by the vehicle, and one or more cameras interfacing with the controller. The one or more cameras are integrated into the vehicle in respective one or more selected positions in the vehicle, and are configured to capture images of the vicinity of the vehicle. The vehicle camera system further includes a motion sensor and a transceiver carried by the vehicle and interfacing with the controller. The motion sensor is configured to detect motion of an object and/or a person in the vicinity of the vehicle. The controller is configured to initiate image capturing by the one or more cameras and to cause the transceiver to emit a wireless positive detection signal, responsively to the motion sensor detecting the motion of an object and/or a person in the vicinity of the vehicle. The vehicle camera system further includes a phone and a key fob in wireless communication with the transceiver and with one another. The phone is configured to receive the positive detection signal by the electronic processor and responsively generate a sensory alarm notification perceivable by a user of the phone. In turn, the key fob comprises a user interface and is configured to emit an alarm deactivation signal responsively to user operation of the user interface of the key fob. The phone is configured to stop the sensory alarm notification responsively to receiving the alarm deactivation signal from the key fob.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a vehicle camera system which can be integrated into a vehicle at one or more positions or locations to detect and reveal the identity of an offending person and/or vehicle in the case of a collision or damage to the vehicle.

Figure 1:
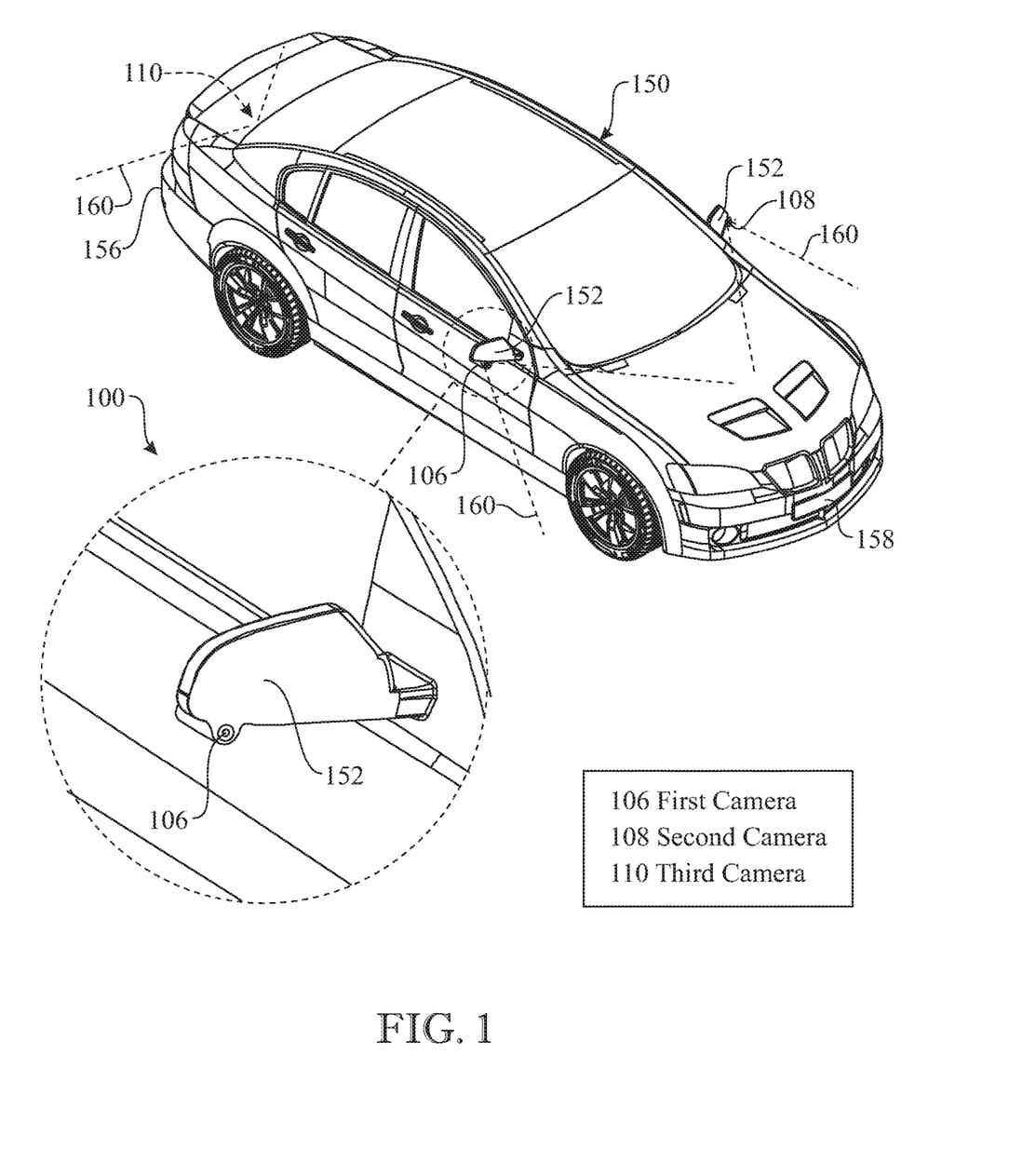
FIG. 1 presents a perspective view showing an illustrative embodiment of the vehicle camera system of the present invention, with a camera integrated into a side view mirror of the vehicle.
Figure 2:
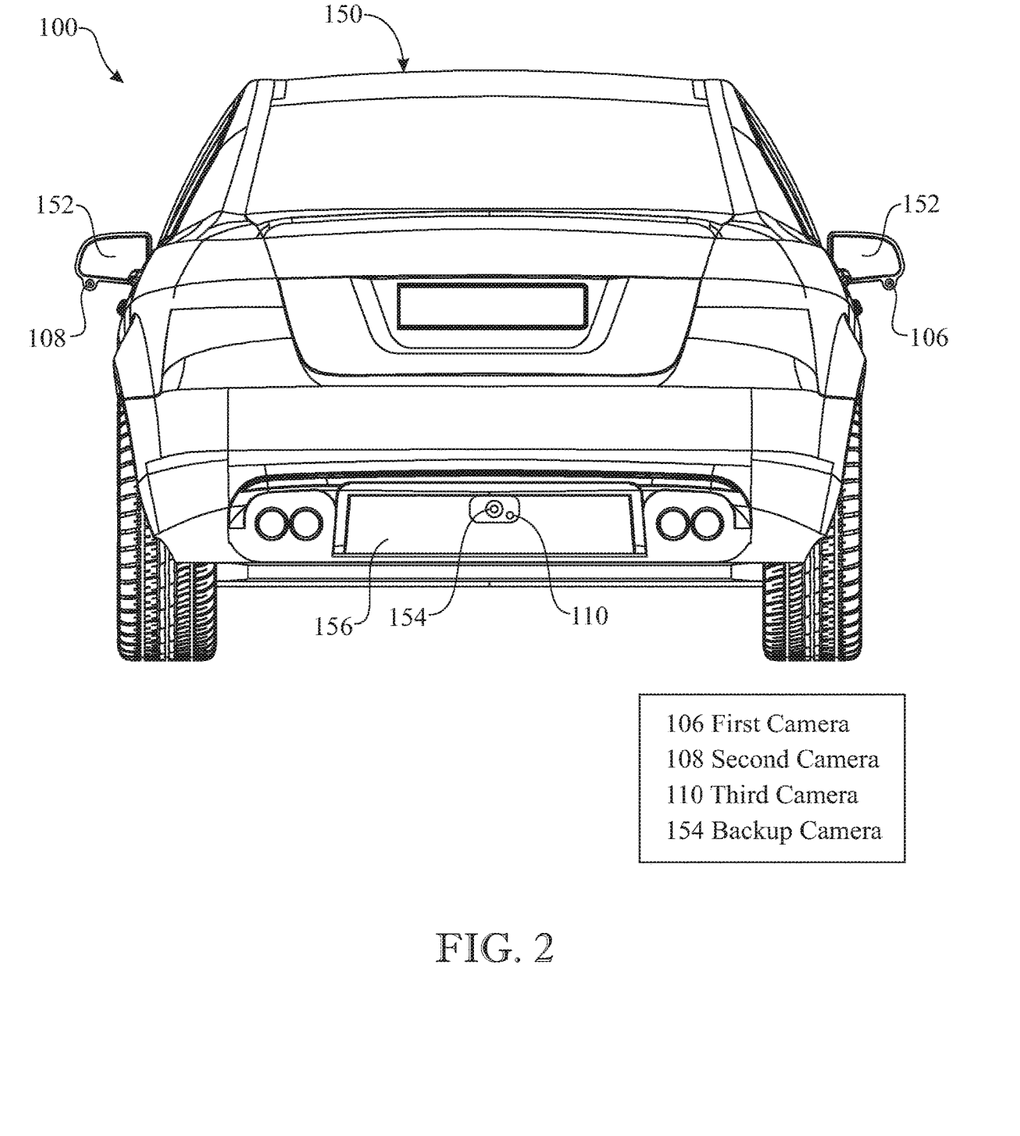
FIG. 2 presents a rear view of the illustrative embodiment of the vehicle camera system of the present invention, with a pair of cameras integrated into the respective side view mirrors and a third camera integrated into the rear end of the vehicle.
Figure 3:
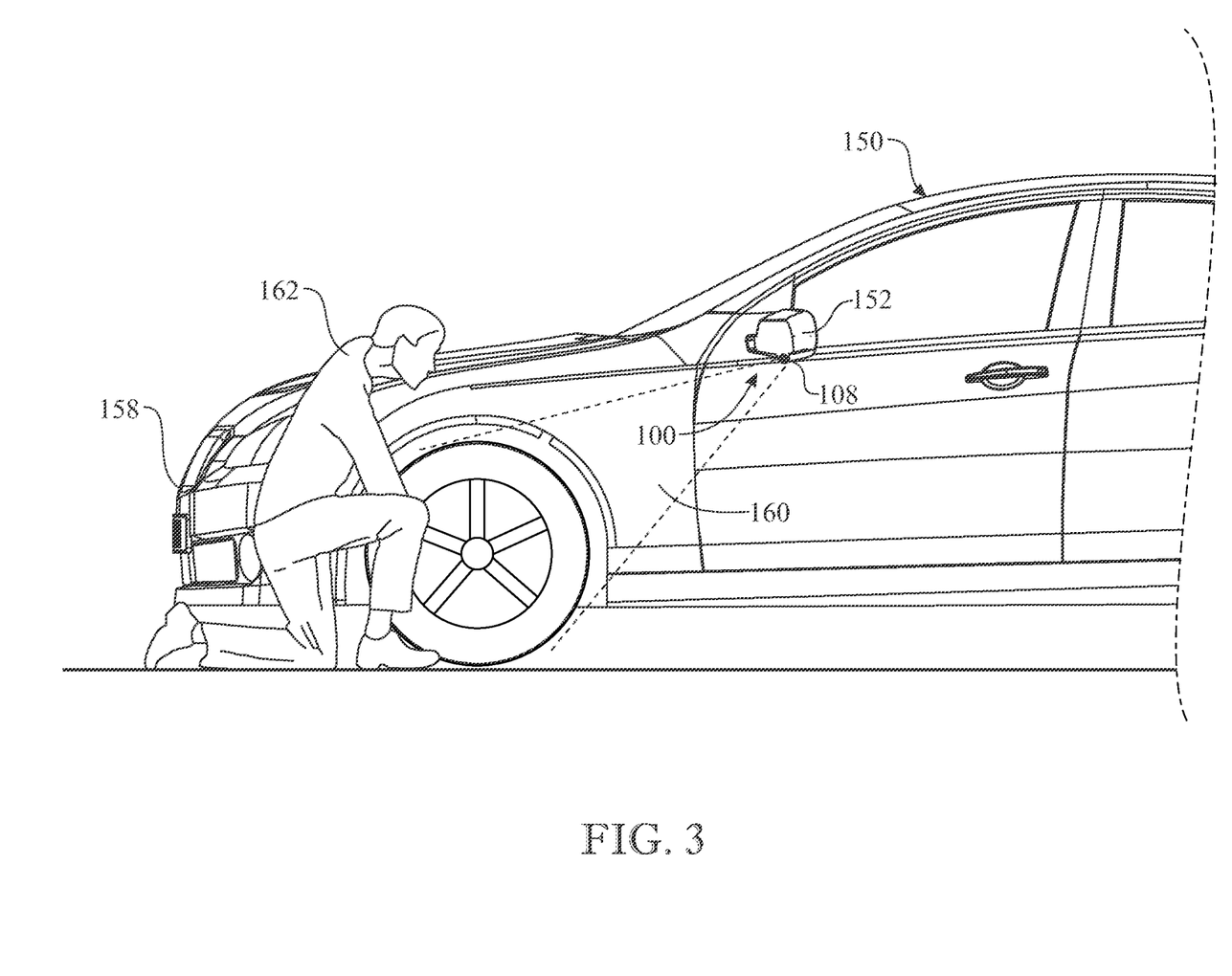
FIG. 3 presents a left side view of the vehicle with the camera integrated into the side view mirror according to an illustrative embodiment of the vehicle camera system of the present invention, with an offending person within an image capture field of the camera.

Referring initially to FIGS. 1-3, an illustrative embodiment of the vehicle camera system is generally indicated by reference numeral 100. The vehicle camera system 100 may include at least one camera which may be integrated into a vehicle 150 in at least one position or location on the vehicle 150. For example and without limitation, as illustrated in FIG. 1, in some embodiments, the vehicle camera system 100 may include a first camera 106 and a second camera 108 which may be integrated into the respective left and right, side view mirrors 152 of the vehicle 150. As illustrated in FIG. 2, in some embodiments, the vehicle camera system 100 may additionally or alternatively include a camera 110 at the rear end of the vehicle 150, such as at or adjacent to a backup camera 154 included in the rear end of vehicle 150, for example and without limitation. In some embodiments, the vehicle camera system 100 may include the first camera 106 and the second camera 108 integrated into the respective side view mirrors 152 and the third camera 110 integrated into the rear end 156 of the vehicle 150, as illustrated. In alternative embodiments, the at least one camera of the present disclosure (e.g., cameras 106, 108, 110) may be integrated into the vehicle 150 at additional or alternative locations or positions.

As illustrated in FIG. 1, each camera 106, 108 and 110 has an associated or respective image capture field 160, i.e. a space or area of which images can be captured by the camera 106, 108 and 110. Each camera 106, 108, 110 may be suitably oriented in such a manner that an offending or damage-causing person 162 and/or an offending or damage-causing vehicle (not illustrated) is within the image capture field(s) 160 of one or more of the cameras 106, 108, 110. For example and without limitation, each of the first camera 106 and the second camera 108 may be oriented such that their respective image capture field 160 is directed forwardly toward the front end 158 of the vehicle 150, as illustrated in FIG. 1. In turn, the third camera 110 may be oriented such that its image capture field 160 is directed rearwardly away from the rear end 156 of the vehicle 150. Accordingly, as shown for instance in FIG. 3, the first camera 106 and the second camera 108 may be suitably positioned and oriented to capture at least one image of an offending person 162 and/or vehicle (not illustrated) which approaches the front end 158 or side of the vehicle 150, whereas the third camera 110 may be suitably positioned and oriented to capture the image of an offending person 162 and/or vehicle which may approach the rear end 156 of the vehicle 150.

The at least one image captured by each camera 106, 108, 110 may include at least one photographic image and/or at least one video image. Each camera 106, 108, 110 may capture details such as facial features, hair color, height, build and clothing of the offending person 162 and/or the color, make information or insignia on the vehicle, model information or insignia on the vehicle and/or license plate number of the offending vehicle in the event that the offending person 162 or vehicle strikes and damages the vehicle 150. In some embodiments, one or more of the cameras 106, 108, 110 may have the capability to capture at least one audio file which may include or contain the voice of the offending person 162. In other words, the one or more of the cameras 106, 108, 110 may include at least one microphone configured to capture audio from the vicinity of the vehicle 150. As will be hereinafter described, the system 100 may have the capacity to store and facilitate retrieval of the image or images captured by the cameras 106, 108, 110 and audio captured by the microphone or microphones for subsequent use in identifying the offending person 162 and/or vehicle.

Figure 6:
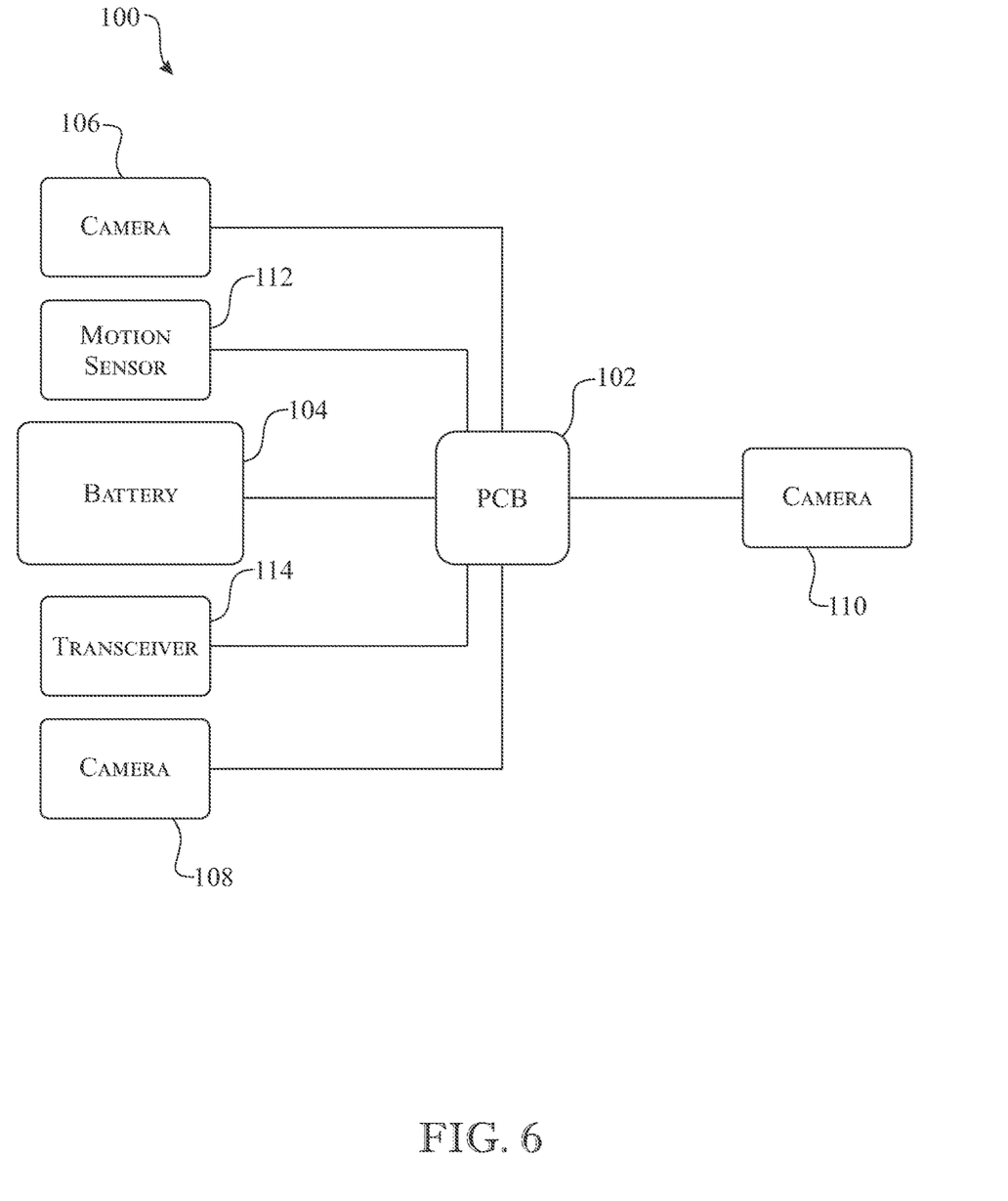
FIG. 6 presents a functional block diagram illustrating various functional components of the vehicle camera system.

Referring next to FIG. 6, the vehicle camera system 100 may include a PCB (Printed Circuit Board) or other controller, hereinafter referred to generically as PCB 102, which can include a microprocessor, microcontroller or other processor unit or units, for instance and without limitation. The cameras 106, 108, 110 may functionally interface with the PCB 102. Accordingly, the PCB 102 may have the capacity to activate and deactivate the cameras 106, 108, 110. The PCB 102 may further include an electronic data storage memory to facilitate storage of the images and audio captured by the cameras 106, 108, 110. At least one battery and/or other power source, hereinafter battery 104, may interface with the PCB 102 and the cameras 106, 108 and 110. In some embodiments, the battery 104 may include at least one disposable battery and/or at least one rechargeable battery. In some embodiments, the battery 104 may additionally or alternatively include at least one solar cell or panel.

As further illustrated in FIG. 6, in some embodiments, a motion sensor 112 may interface with the PCB 102. The motion sensor 112 may be suitably configured to detect motion of an offending person 162 (FIG. 4) and/or vehicle approaching the vehicle 150 and transmit an appropriate signal to the PCB 102. The PCB 102 may be configured to activate one or more of the cameras 106, 108, 110 to capture an image in its image capture field 160 (FIG. 3) responsively to the motion sensor 112 transmitting the aforementioned appropriate signal to the PCB 102. The PCB 102 may additionally include one or more ports (not illustrated) such as USB ports or the like to facilitate retrieval and viewing of the image or images captured by the cameras 106, 108, 110.

Figure 5:
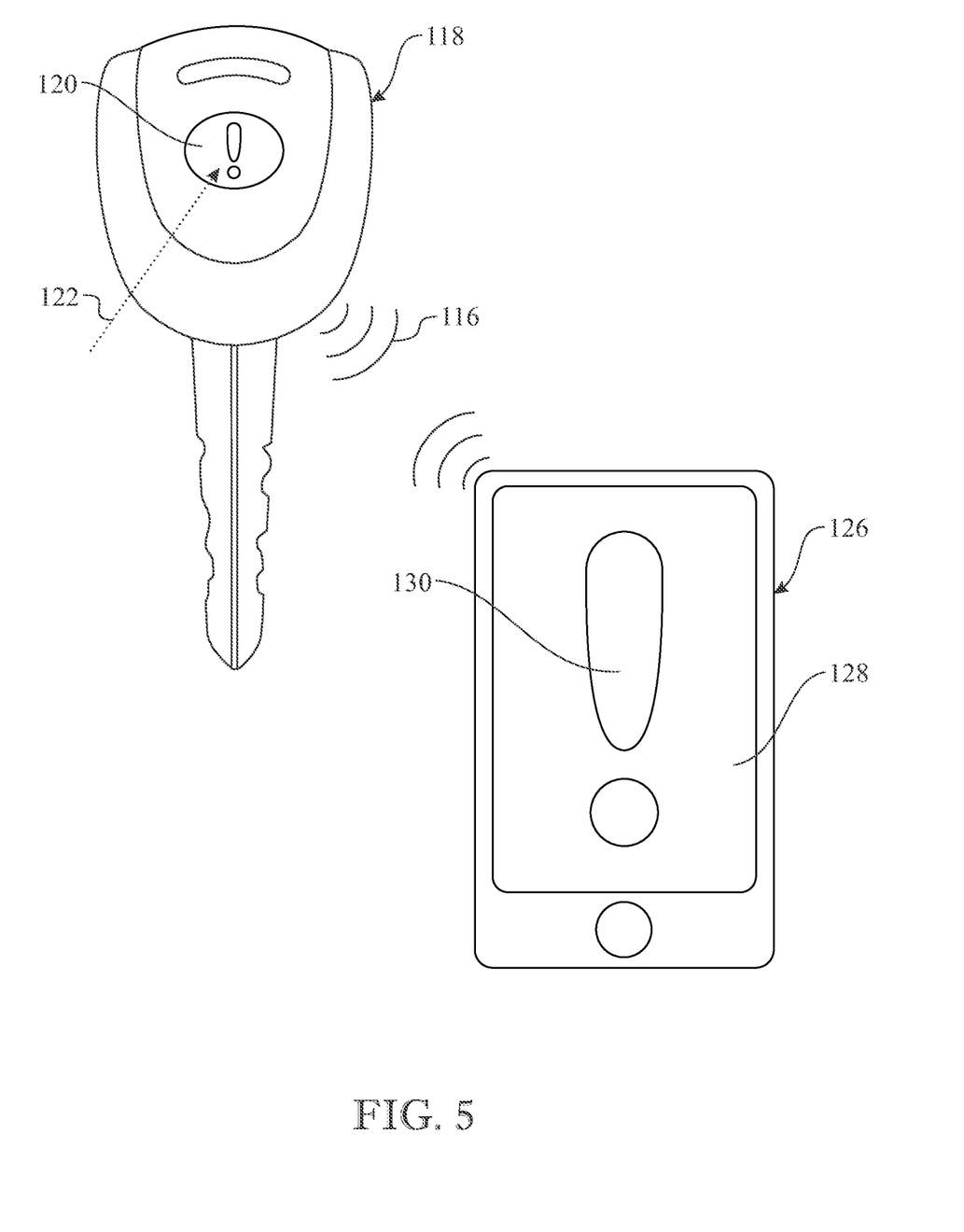
FIG. 5 presents a front view showing a vehicle key fob and a smartphone, with the vehicle key fob activating the smartphone to activate the vehicle camera system, stop the alarm indication on the smartphone and/or provide a visual, audible and/or vibratory alarm indication to the smartphone in typical application of an illustrative embodiment of the vehicle camera system of the present invention.

As further illustrated in FIG. 6, in some embodiments, a transceiver 114 may interface with the PCB 102. As illustrated in FIG. 5, the transceiver 114 may be configured to communicate wirelessly (e.g. by radiofrequency transmission) with external electronic devices, as will be described hereinafter. The external devices may include a key fob 118 and/or a smartphone 126 which can be carried, for instance and without limitation, by the owner and driver of the vehicle 150 (hereinafter referred to as vehicle operator or user).

In some embodiments, such as the present embodiment, the PCB 102, cameras 106, 108 and 110, motion sensor 112, transceiver 114 and battery 104 may be located in the vehicle 150 or carried by the vehicle 150. The PCB 102, cameras 106, 108 and 110, motion sensor 112 and transceiver 114 may be powered by the battery 104.

The key fob 118 and/or smartphone 126 may include a user interface which may enable a user to activate and deactivate the system 100 remotely. For example, the key fob 118 may include a user interface 120 including one or more manually-operable buttons, switches, tactile controls, or the like, allowing the key fob 118 to be manually operated by the user. In turn, the smartphone 126 may include a screen 128 and may run a software application which provides a graphical user interface on the screen 128 and/or provides a voice-command-enabled user interface. The key fob 118 and smartphone 126 may be configured such that manual operation of the corresponding user interface causes the key fob 118 or smartphone 126 to emit an activation or deactivation signal to the PCB 102, via the transceiver 114, to activate or deactivate the sensor 112 and cameras 106, 108, 110.

Figure 4:
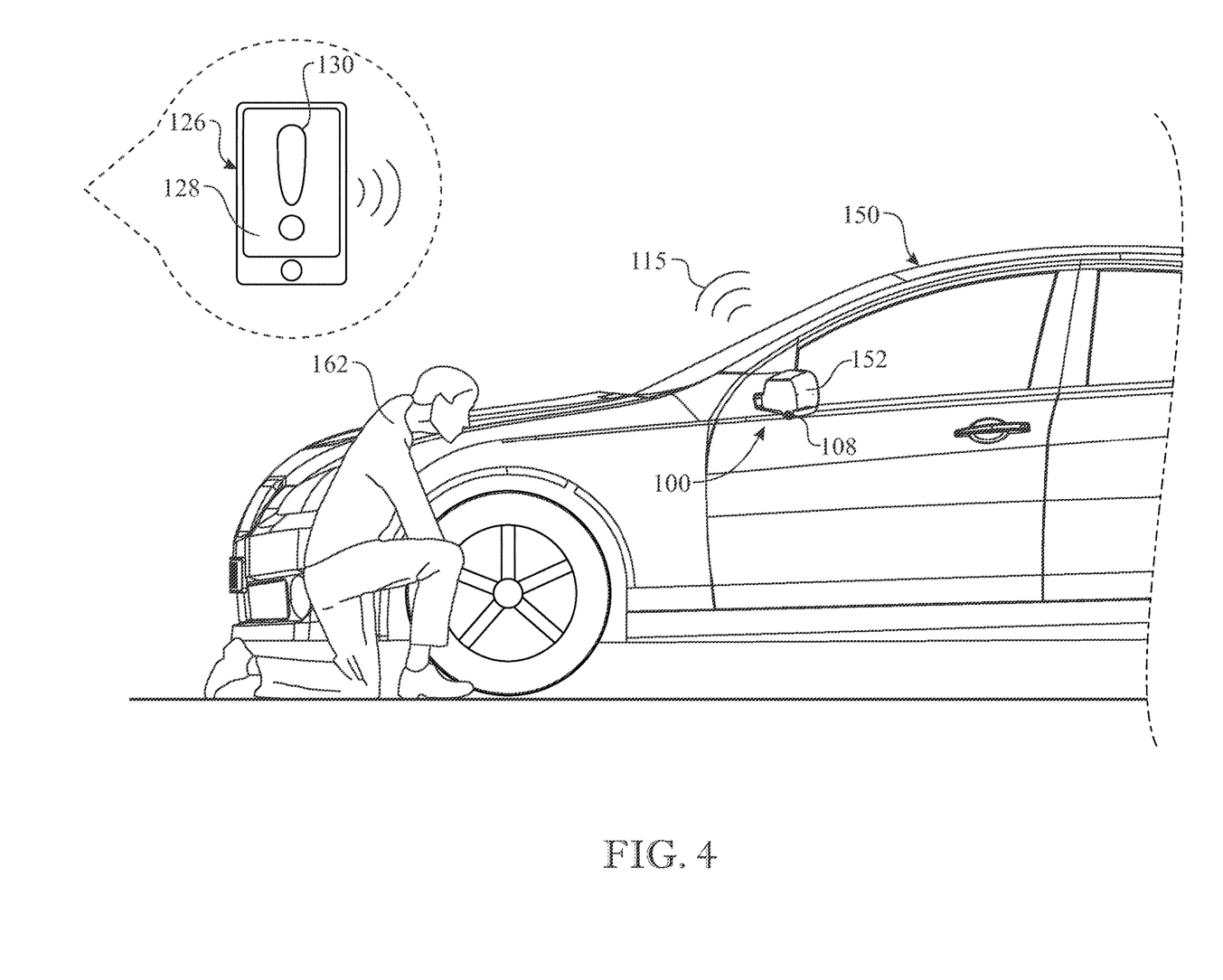
FIG. 4 presents a left side view of the vehicle with the camera integrated into the side view mirror according to an illustrative embodiment of the vehicle camera system of the present invention, with the offending person within the image capture field of the camera, more particularly illustrating typical activation of a smartphone possessed by the owner or driver of the vehicle in response to the incident.

The software application running on the smartphone 126 may be configured to cause the smartphone 126 to provide at least one sensory alarm notification detectable by the user carrying the smartphone 126; for instance and without limitation, providing at least one sensory alarm notification can include displaying a visual alarm notification 130 on the screen 128, emitting an audible alarm notification via a speaker included in the smartphone 126 and/or generating a vibratory alarm notification via a vibrator device or component comprised in the smartphone 126). As shown in FIG. 4, in some embodiments or applications of the invention, the PCB 102 of the system 100 carried by the vehicle 150 may be configured to transmit a positive detection signal 115 to the smartphone 126 carried by the user, via the transceiver 114, in the event that the motion sensor 112 detects a motion in the vicinity thereof (which will also cause one or more of the cameras 106, 108, 110 installed in the vehicle 150 to start capturing images, and optionally audio). The software application on the smartphone 126 may be configured to generate the at least one sensory (i.e. visual, audible and/or vibratory) alarm notification responsively to receiving the positive detection signal 115 from the transceiver 114.

In some embodiments, the PCB 102 of the vehicle camera system 100 may be configured to transmit the image or images captured by the camera or cameras 106, 108, 110 carried by the vehicle 150, and optionally the audio captured by the microphone(s) comprised in the camera(s), to the smartphone 126 carried by the user, via the transceiver 114. The software application running on the smartphone 126 may display the captured image or images on the screen 128 of the smartphone 126, and may emit the received audio via one or more speakers included in the smartphone 126. Images may be displayed in real time or may be delayed or recorded for later viewing. Similarly, audio may be emitted in real time or may be delayed or recorded.

Via the user interfaces of the key fob 118 and/or the smartphone 126, the user may terminate the alarm notification (e.g., the visual alarm notification 130) on the smartphone 126. For instance, as shown in FIG. 5, the user may operate the user interface 120 on the key fob 118 (i.e. may push a button included in the user interface 120 as indicated by arrow 122) to cause the key fob 118 to generate and transmit an alarm deactivation signal 116 to the smartphone 126; upon receiving the alarm deactivation signal 116, the smartphone software application may responsively terminate the sensory alarm notification on the smartphone 126. In another example, the user may operate the user interface (i.e. graphical user interface on the smartphone screen 128) to command the smartphone software application to stop the alarm; upon detecting said user operation of the user interface, the smartphone software application may responsively terminate the sensory alarm notification on the smartphone 126.

Furthermore, in some embodiments, the user may deactivate one or more of the cameras 106, 108 and 110 comprised in the vehicle camera system 100 by operating the user interface in the key fob 118 and/or the user interface provided by the smartphone software application. Responsively to such operation of the user interface, the corresponding device (key fob 118 or smartphone 126) transmits a deactivation signal to the PCB 102 via the transceiver 114, and the PCB 102 responsively deactivates the one or more cameras 106, 108, 110 as remotely commanded by the user.

In an example of operation of the system 100, the first camera 106 and the second camera 108 may be integrated into the respective side view mirrors 152, for instance during fabrication of the vehicle 150. The third camera 110 may be integrated into the rear end 156 of the vehicle 150, for instance adjacent to the backup camera 154. The PCB 102, battery 104, motion sensor 112, transceiver 114 and other components of the system 100 are also installed in the vehicle 150 and may be incorporated into the same or different housing or housings as the cameras 106, 108, 110.

In an illustrative application, the vehicle 150 may be parked among other vehicles in a parking lot (not illustrated), after which the operator of the vehicle 150 typically exits the vehicle 150 and enters a nearby business establishment or other facility. In the event that an offending person 162, as illustrated in FIGS. 3 and 4, or vehicle (not illustrated) approaches and strikes or otherwise damages the vehicle 150, the motion sensor 112 may detect the motion of the offending person 162 or vehicle and activate one or more of the first camera 106, the second camera 108 and the third camera 110. Accordingly, the first camera 106 and the second camera 108 may extend their respective image capture fields 160 forwardly, whereas the third camera 110 may extend its image capture field 160 rearwardly of the vehicle 150. One or more of the cameras 106, 108, 110 may capture one or more images of the offending person 162 and the offending vehicle and may store the image in the memory of the PCB 102. The images may be retrieved from the memory of the PCB 102 for viewing and identification of the offending person 162 and/or vehicle.

In some embodiments, the PCB 102 may transmit the positive detection signal 115 (FIG. 4) to the smartphone 126 of the vehicle operator via the transceiver 114. The software application on the smartphone 126 may responsively display the visual alarm notification 130 on the screen 128 of the smartphone 126, as illustrated in FIGS. 4 and 5. Thus, the vehicle operator is notified that the vehicle 150 has been struck or damaged and may exit the business establishment and examine the vehicle 150. Additionally or alternatively, the smartphone app on the smartphone 126 may notify the vehicle operator via an auditory and/or vibratory alarm.

In some embodiments, the PCB 102 may transmit the images, and optional audio, captured by the cameras 106, 108, 110 to the smartphone 126 via the transceiver 114. The smartphone app on the smartphone 126 may display the captured images on the screen 128 of the smartphone 126 and play the audio on a speaker. Accordingly, the vehicle operator may be able to identify the offending person 162 and/or vehicle by viewing the image or images on the screen 128 of the smartphone 162, and optionally listening to voices or other sounds. As mentioned heretofore, in some embodiments, the user interface 120 on the key fob 118 or the smartphone 126 may be manipulated to activate or deactivate one or more of the cameras 106, 108, 110 of the system 100, to provide a visual, audible and/or vibratory alarm notification to the vehicle operator via the smartphone 126, and/or terminate the alarm notification being provided by the smartphone 126.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A vehicle camera system for integration into a vehicle, comprising:
   a controller carried by the vehicle;
   one or more cameras interfacing with the controller, wherein the one or more cameras are integrated into the vehicle in respective one or more selected positions in the vehicle, the one or more cameras configured to capture images of the vicinity of the vehicle;
   a microphone integrated into the one or cameras, the microphone being configured to capture audio from the vicinity of the vehicle;
   a motion sensor carried by the vehicle and interfacing with the controller, the motion sensor configured to detect motion of an object and/or a person in the vicinity of the vehicle;
   a transceiver carried by the vehicle and interfacing with the controller; wherein
   the controller is configured to initiate image capturing by the one or more cameras, to cause the transceiver to emit a wireless positive detection signal, and to transmit audio captured by the microphone, responsively to the motion sensor detecting said motion of an object and/or a person in the vicinity of the vehicle; and
   a non-transitory computer-readable medium storing software instructions configured to cause an electronic processor to carry out the operations of:
   enabling wireless communication between a key fob and the controller, via the transceiver, wherein the key fob comprises the electronic processor;
   receiving the positive detection signal by the electronic processor; and responsively generating a sensory alarm notification perceivable by a user of the key fob;
   providing a user interface accessible by the user of the key fob;
   receiving a user command entered via the user interface; and responsively
   transmitting a wireless deactivation signal receivable by the controller via the transceiver; wherein
   the controller is configured to deactivate at least one of the motion sensor and the one or more cameras responsively to receiving the wireless deactivation signal.

2. The vehicle camera system of claim 1, wherein the images include a photographic image.

3. The vehicle camera system of claim 1, wherein the images include a video image.

4. The vehicle camera system of claim 1, wherein the one or more cameras include a camera located in a side view mirror of the vehicle.

5. The vehicle camera system of claim 1, wherein the one or more cameras include two cameras located in a left side view mirror and a right side view mirror, respectively, of the vehicle.

6. The vehicle camera system of claim 5, wherein the two cameras are configured to capture images of a side and front of the vehicle.

7. The vehicle camera system of claim 1, wherein the one or more cameras comprise a camera located at a rear of the vehicle and configured to capture images of an area behind the vehicle.

8. The vehicle camera system of claim 1, wherein the sensory alarm notification comprises at least one of a visual notification, an audible notification and a vibratory notification.

9. The vehicle camera system of claim 1, wherein the controller is further configured to transmit images captured by the one or more cameras responsively to the motion sensor detecting said motion of an object and/or a person in the vicinity of the vehicle.

10. The vehicle camera system of claim 9, further comprising a non-transitory computer-readable medium storing software instructions configured to cause an electronic processor to carry out the operations of:
   enabling wireless communication between an electronic device and the controller, via the transceiver, wherein the electronic device comprises the electronic processor and a screen;
   receiving, by the electronic processor, the positive detection signal and the images captured by the one or more cameras; and responsively
   generating a sensory alarm notification perceivable by a user of the electronic device and displaying the received images on the screen.

11. The vehicle camera system of claim 10, wherein the sensory alarm notification comprises at least one of a visual notification, an audible notification and a vibratory notification.

12. The vehicle camera system of claim 1, further comprising a non-transitory computer-readable medium storing software instructions configured to cause an electronic processor to carry out the operations of:
 enabling wireless communication between an electronic device and the controller, via the transceiver, wherein the electronic device comprises the electronic processor, a screen and a speaker;
 receiving, by the electronic processor, the positive detection signal and the images and audio captured by the one or more cameras; and responsively
 generating a sensory alarm notification perceivable by a user of the electronic device, displaying the received images on the screen and emitting the audio by the speaker.

13. A vehicle camera system for integration into a vehicle, comprising:
 a controller carried by the vehicle;
 one or more cameras interfacing with the controller, wherein the one or more cameras are integrated into the vehicle in respective one or more selected positions in the vehicle, the one or more cameras configured to capture images of the vicinity of the vehicle;
 a motion sensor carried by the vehicle and interfacing with the controller, the motion sensor configured to detect motion of an object and/or a person in the vicinity of the vehicle; and
 a transceiver carried by the vehicle and interfacing with the controller; wherein
 the controller is configured to initiate image capturing by the one or more cameras and to cause the transceiver to emit a wireless positive detection signal, responsively to the motion sensor detecting said motion of an object and/or a person in the vicinity of the vehicle; and
 a phone in wireless communication with the transceiver, wherein the phone is configured to receive the positive detection signal by the electronic processor and responsively generate a sensory alarm notification perceivable by a user of the phone; and
 a non-transitory computer-readable medium storing software instructions configured to cause an electronic processor to carry out the operations of:
 enabling wireless communication between a key fob and the controller, via the transceiver, wherein the key fob comprises the electronic processor,
 receiving the positive detection signal by the electronic processor; and responsively generating a sensory alarm notification perceivable by a user of the key fob;
 providing a user interface accessible by the user of the key fob;
 receiving a user command entered via the user interface; and responsively
 transmitting a wireless deactivation signal receivable by the controller via the transceiver; wherein
 the controller is configured to deactivate at least one of the motion sensor and the one or more cameras responsively to receiving the wireless deactivation signal.

14. The vehicle camera system of claim 13, wherein the sensory alarm notification comprises at least one of a visual notification, an audible notification and a vibratory notification.

15. A vehicle camera system for integration into a vehicle, comprising:
 a controller carried by the vehicle;
 one or more cameras interfacing with the controller, wherein the one or more cameras are integrated into the vehicle in respective one or more selected positions in the vehicle, the one or more cameras configured to capture images of the vicinity of the vehicle;
 a microphone integrated into the one or cameras, the microphone being configured to capture audio from the vicinity of the vehicle;
 a motion sensor carried by the vehicle and interfacing with the controller, the motion sensor configured to detect motion of an object and/or a person in the vicinity of the vehicle; and
 a transceiver carried by the vehicle and interfacing with the controller; wherein
 the controller is configured to initiate image capturing by the one or more cameras, to cause the transceiver to emit a wireless positive detection signal, and to transmit audio captured by the microphone, responsively to the motion sensor detecting said motion of an object and/or a person in the vicinity of the vehicle;
 a phone in wireless communication with the transceiver, wherein the phone is configured to receive the positive detection signal by the electronic processor and responsively generate a sensory alarm notification perceivable by a user of the phone; and
 a key fob in wireless communication with the transceiver and phone, wherein the key fob comprises a user interface and is configured to emit an alarm deactivation signal responsively to user operation of the user interface of the key fob and also configured to wirelessly communicate with the controller via the transceiver such that the key fob may cause the controller to deactivate at least one of the motion sensor and the one or more cameras; and further wherein
 the phone is configured to stop the sensory alarm notification responsively to receiving the alarm deactivation signal from the key fob.

* * * * *